Aug. 9, 1938.                F. W. PRESTON                2,126,574
                            STRUCTURAL GLASS
                         Filed Nov. 23, 1935            3 Sheets-Sheet 2
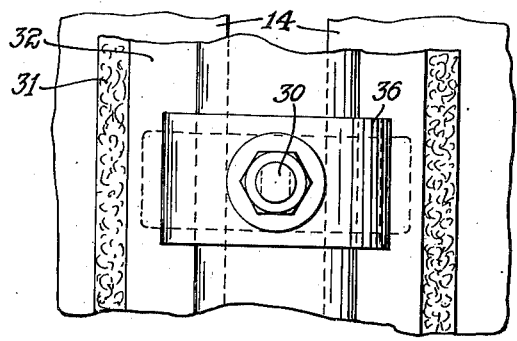
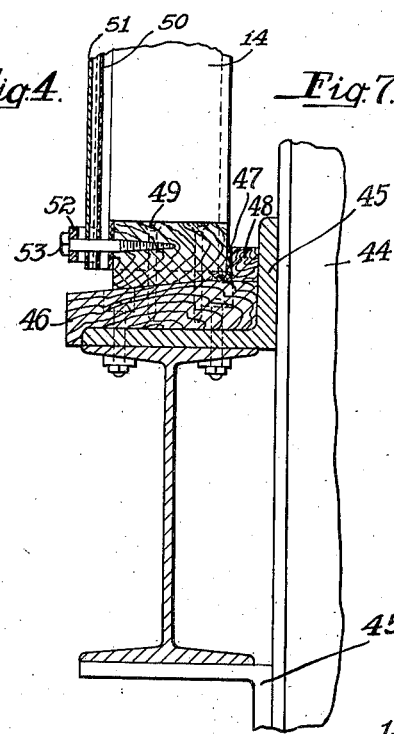
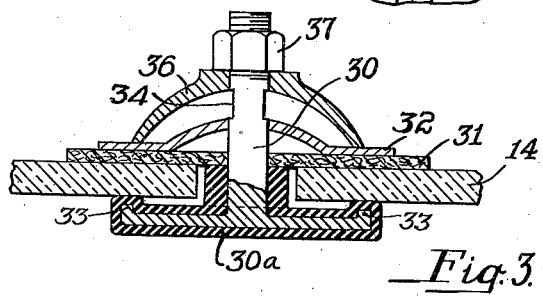
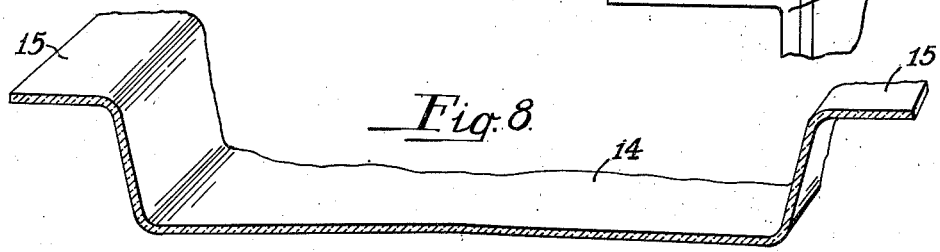
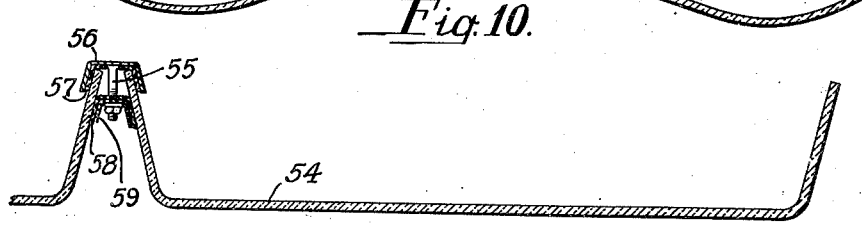
INVENTOR
Frank W. Preston,
By Archworth Martin,
       Attorney.

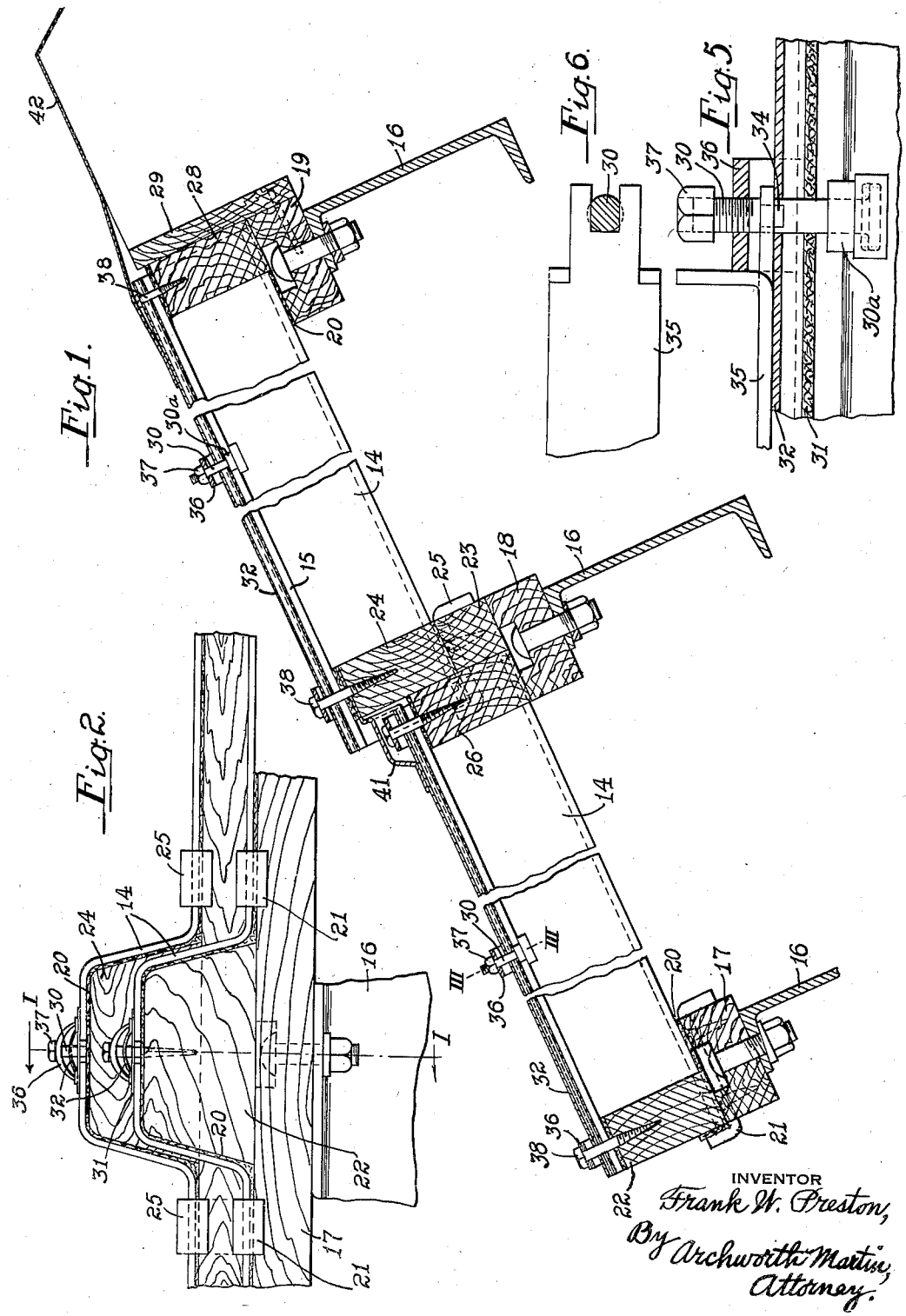

Aug. 9, 1938.  F. W. PRESTON  2,126,574
STRUCTURAL GLASS
Filed Nov. 23, 1935  3 Sheets-Sheet 3
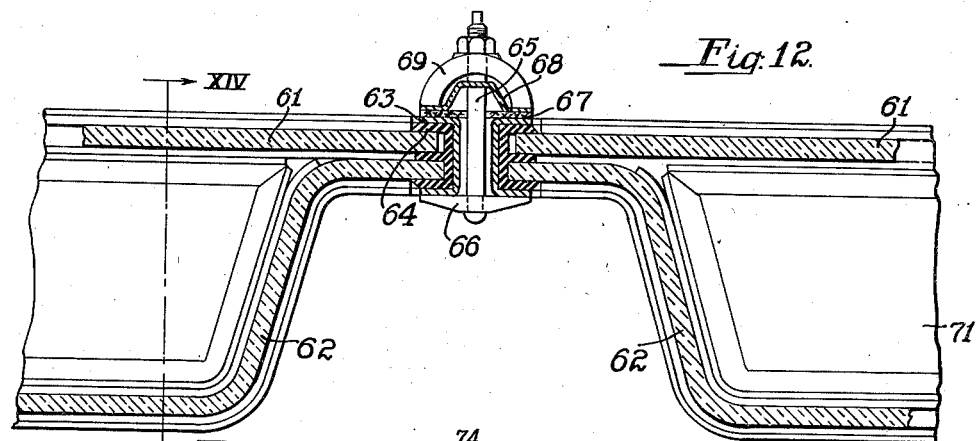
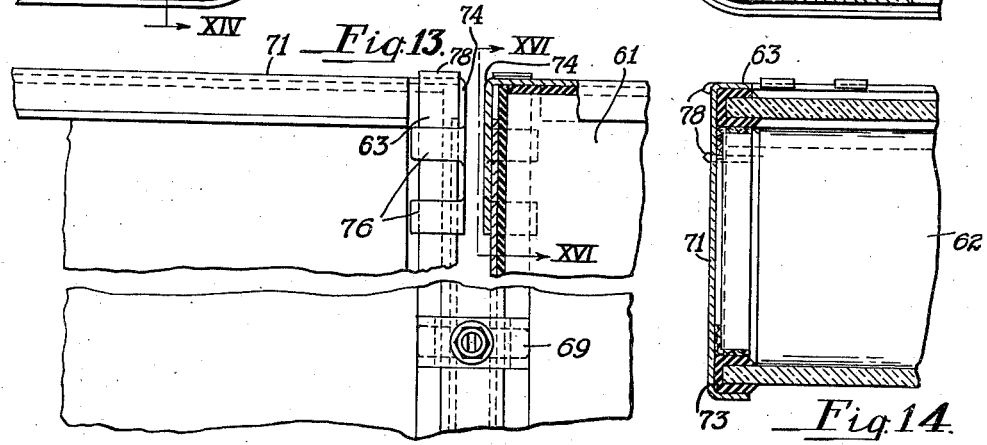
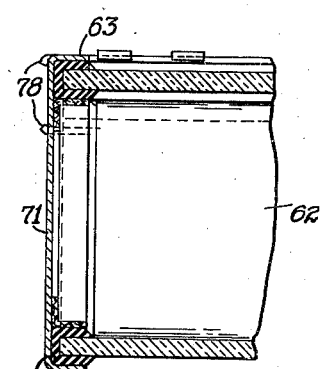
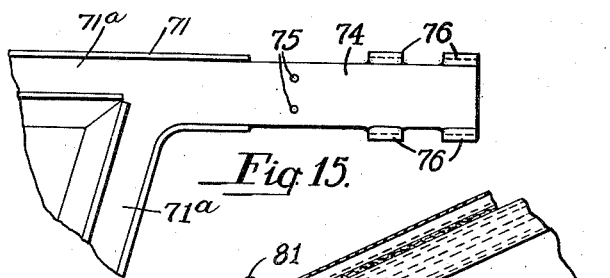
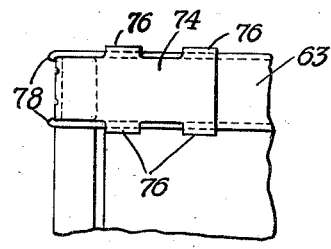
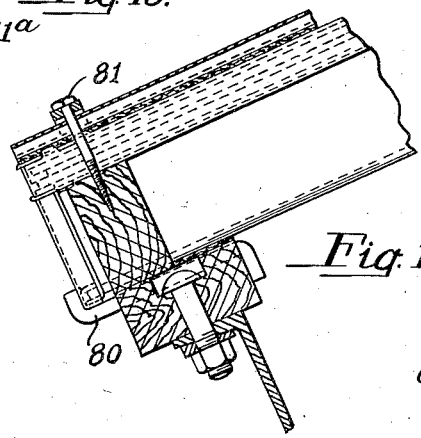
INVENTOR
Frank W. Preston,
By Archworth Martin,
Attorney.

Patented Aug. 9, 1938

2,126,574

UNITED STATES PATENT OFFICE 2,126,574

STRUCTURAL GLASS

Frank W. Preston, Butler, Pa.

Application November 23, 1935, Serial No. 51,261

4 Claims. (Cl. 108—16)

My invention relates to building structures, including the roofs and walls thereof, and particularly to the employment of glass panels or structural elements in such structures.

One object of my invention is to provide a glass panel or structural element of such section modulus that for a given quantity or weight of material the unit will be of sufficient strength to span distances of considerable length and width.

Another object of my invention is to provide a structural glass element of channel form and which can be readily cut to form panels of various widths.

Still another object of my invention is to provide a wall or roof structure wherein the glass panels may conveniently be assembled from exteriorly of the building, and with a minimum requirement of scaffolding.

Still another object of my invention is to provide structural elements and fastening devices therefor of such form that the various parts can be made at the factory and readily installed at the building site.

A further object of my invention is to provide an improved form of joint structure for glass panels.

Still another object of my invention is to provide a structure of the character referred to wherein provision is made for dead air spaces in a wall or roof, for the purpose of thermal insulation.

Some of the forms which my invention may take are shown in the accompanying drawings wherein Figure 1 is a a sectional view through a portion of a roof, taken on the line I—I of Fig. 2; Fig. 2 is an end view thereof; Fig. 3 is an enlarged view taken on the line III—III of Fig. 1; Fig. 4 is a plan view of the structure of Fig. 3; Fig. 5 is a view showing a manner in which parts of the structure may conveniently be connected together; Fig. 6 is a plan view of a portion of the structure of Fig. 5; Fig. 7 is a vertical sectional view through a portion of a side wall structure; Figs. 8, 9 and 10 are views showing various forms of glass panels which may be employed; Fig. 11 is a modification of the structure of Fig. 2; Fig. 12 is a view showing the manner in which a double panel structure is formed, to provide dead air spaces; Fig. 13 is a sectional plan view thereof; Fig. 14 is a view taken on the line XIV—XIV of Fig. 12; Fig. 15 is a view showing one of the corner clips of Fig. 13; Fig. 16 is a view taken on the line XVI—XVI of Fig. 13, and Fig. 17 is a sectional view showing the manner in which the double panel arrangement is connected to a roof purlin.

In Figs. 1 to 5, I show a portion of a roof structure embodying panel-like structural elements of glass formed as shown in Fig. 8. These panels 14 are of generally channel form, with extensions on their flanges that form flat marginal portions or lands 15 at the longitudinal edges of the panels. The lands 15 can be of various widths and facilitate assembling of the structure, because portions thereof can be cut away to reduce the overall width thereof, and permit the panels to be employed in areas of various widths.

The panels may be of any desired length, and may suitably be two or three feet in width. The channel form produces a sectional modulus of considerable strength for a given quantity or area of glass. For example, the channel may be four inches in depth. If the sides or flanges of the channels are flared somewhat, the panels can be conveniently nested for shipping and storage. The form of the panel is superior to corrugated sheets in a number of respects such as greater strength for a given quantity of material, more convenient sealing at the ends of the panels, etc. Also, rain will collect in the channels and flow from the roof, with less tendency for the water to find its way into the joints at the edges of the panels.

As shown in Fig. 1, the panels are placed upon roof purlins 16 which are of channel iron. Cap strips 17, 18 and 19 of wood are bolted to the purlins 16, and strips 20 of felt, impregnated with asphalt, are placed upon the cap strips. The panels 14 rest upon these felt strips. The panels at the eaves of the roof are held in place by thrust clips 21 which are set into the cap strip 17 and are of generally Z form, so that their upper ends will abut against the upper edge of the cap strip 17, and their lower bent ends abut against the edges of the panels. The felt 20 also overlies the clips 21, to prevent direct contact between the glass and the metal. Filler blocks 22 of wood or other suitable material are interposed between the raised portions of the panels as shown in Figs. 1 and 2, and the cap strip 17, to provide seals at those points between the cap strip and the glass panels. The felt 20 also overlies the filler blocks 22.

The cap strip 18 supports filler blocks 23 and 24, the blocks 24 corresponding to the filler blocks 22, and serving to seal or close the lower ends of the upper tier of panels 14. Clips 25 which correspond to the clips 21 have their bent ends in engagement with the filler blocks 23, and the lower edges of the sheets 14 respectively, to prevent the second tier of panels 14 from sliding toward the eaves. Filler blocks 26 correspond in shape to the blocks 22, and close the upper ends of the lower tier of panels.

Near the ridge of the roof, filler blocks 28 are employed for sealing the upper ends of the upper tier of panels 14, and a sealing strip 29 extends along the upper edges of these panels 14 throughout the length of the cap strip 19, and is nailed to said cap strip.

When the panels are placed in position on the framework of the roof, their longitudinal edges are sealed and fastened in place. To this end, bolts 30 of T head form are turned so that their elongated heads can be inserted between the adjacent edges of the panels and then given a quarter turn, so that their heads will abut against the undersides of the panels (Figs. 3, 4 and 5). Rubber caps 30a enclose the bolt heads and portions of their shanks, so that the metal of the bolt will not come into direct contact with the glass.

Asphalted felt strips 31 are placed in overlapped relation to the adjacent longitudinal edges of the panels and batten strips 32 of brass or other suitable non-corrodible material are placed upon the felt strips, the strips 31 and 32 having holes so that they can be placed over the bolt shanks. In order to hold the bolts in position while placing the strips thereon, I slightly flatten the sides of the bolts as shown at 34, and temporarily support the bolts by a tool 35 which is shown in Figs. 5 and 6.

This tool may also be employed as a wrench to turn the bolt head into locking engagement with the undersides of the panels. The forked end of the tool will also hold the bolt against falling from the position shown in Fig. 5. While the bolts are held in this manner, clamps 36 and nuts 37 are applied to the bolts. When the nuts 37 are turned down, the clamps 36 will hold the sealing strips and the sheets in tightly assembled relation.

The heads of the bolts have protuberances 33 on their ends and the clamping elements 36 are of convex form so that the clamping forces on the glass will be exerted at points removed from the edges of the panels, thus reducing danger of breakage (see Figs. 3 and 4).

At the extremities of the sealing strips 31 and 32, lag screws 38 are employed instead of the clamping bolts, these screws being driven into the wooden filler blocks.

Above the cap strip 18, a flashing strip 41 of metal is employed to assist in providing a weather-proof joint between the two tiers of panels, this strip being held in place by the adjacent cap screws 38. At the ridge of the roof, a flashing sheet 42 of copper or other suitable metal is secured in place and overlaps the adjacent ends of the upper tier of panels.

Referring now to Fig. 7, I show a side wall or window construction with which panels 14 may be employed. The stanchions, columns, or other framework are represented by the numeral 44 to which angles 45 are welded or otherwise secured. A wooden cap strip 46 is mounted upon the upper angle 45 and the panels are placed against felt strips 47 behind which is a backing strip 48.

Filler block 49 are employed for the upper and lower ends of the panels 14 in substantially the same manner as the filler blocks of Figs. 1 and 2. Likewise, the vertical joints at the edges of the panels are formed by the use of felt strips 50, batten strips 51, clamps 52, and lag screws 53 which may correspond to the elements 31, 32, 36 and 38 of Figs. 1 and 2. Also, where the panels are of considerable length, clamping bolts 30 may be utilized at points between the lag screws. The structures of Figs. 1 to 7 can all be assembled from exteriorly of the building.

Referring now to Fig. 11, I show a structure wherein the glass panels 54 are of more nearly conventional channel form than the channel of Fig. 8. In this structure, bolts 55 extend between adjacent edges of the panels 54 and may either extend through or be welded to a sealing strip 56. Asphalted felt 57 is interposed between the strip 56 and the edges of the panels. A felt or rubber strip 58 is placed in position to be engaged by a V shaped clamping member 59 through which the bolts extend. When the nuts are drawn up on the bolts, the metal members 56 and 59 are drawn toward one another to firmly clamp the edges of the panels.

Referring now to Figs. 12 to 17, I show a structure wherein the panels are each composed of two sheets of glass which are spaced apart over most of their area in order to provide dead air spaces for the purpose of thermal insulation. The glass sheets 61 may be flat, and the sheets 62 correspond in shape somewhat to the shape of the sheet of Fig. 8.

The units or panels are respectively formed by joining the sheets 61 and 62 at their edges by the use of metal channels 63, which have clamping engagement with rubber inserts or spacers 64, of double channel form, the longitudinal edges of the glass sheets fitting into the rubber channels. Adjacent units are held in assembled relation at their longitudinal edges by means of clamping bolts 65 having elongated heads 66 that engage the inner sides of the metal channels 63. Fabric or rubber strips 67 overlie the outer faces of the channel 63, and a metal seal 68 overlies the strips 67. Clamping yokes 69 overlie the sealing strips 68 and, in co-operation with the head of the bolt 66, will draw the parts into tightly assembled relation when the nuts are screwed up on the bolts.

In order to seal the air space between the sheets 61 and 62 at their ends, metal cover plates 71 are provided, channels 71a being formed interiorly thereof to fit the ends of the sheets 61 and 62. Rubber packing 73 is interposed between the glass and the metal in these channels. The end plates are connected to the longitudinally-extending channels 63 by tongue-like extensions 74 that are welded to or formed integrally with the end plates, and are weakened by holes at 75, so that they can be readily bent into parallelism with the channels 63. The tongues 74 have clips 76 formed on their edges which are bent into gripping engagement with the channels 63. In order to additionally fasten the channel 63 and the end plates together, the extremities of the channels are provided with tongues 78 that are bent into overlying relation with the face of the tongue 74.

The panels constructed as shown in Figs. 12 to 16 can be connected to a roof, or wall framework substantially in the same manner that the panels 14 are fastened, namely by the use of thrust clips 80 and lag screws 81, as shown in Fig. 17.

It will be obvious that with little or no modification of fastening arrangements as heretofore described, the glass plates 82 and 83 of Figs. 9 and 10 could be employed instead of the plates 14.

In the case of all four forms of glass sheet shown in Figs. 8 to 11, there is, of course, a sectional modulus that greatly strengthens the glass as compared with flat glass, or even glass having shallow corrugations. Also, in each case, gutter-like depressions are present along lines removed from the longitudinal edges of the sheet, down which rain may flow in streams separated from the joints. The glass sheets as formed, will be of sufficient strength to extend over spans of considerable area.

The glass sheets are straight in directions longitudinally thereof and can therefore be readily shaped by rolling, or by supporting the longitudinal edges thereof and permitting the mid portions to sag.

Another method of manufacture consists in rolling a wire glass to a flat form, and subsequently bending it to the channel or structural shape. This bending process is done while the glass is hot, of course, probably 1200° F. or hotter, and it may be done either before the glass cools down and goes through its first annealing process, or it may be done by first forming the glass flat and annealing it and cooling it off in this condition, and subsequently re-heating it and by pressing or bending or other means forming it to the correct shape.

I believe it an entirely new process to form the glass flat and then bend it into a structural shape before it has cooled at all.

The glass sheets of Figs. 8 to 10 can be of any desired quality or character of glass, and can be of wire glass. Similarly, either or both of the sheets of glass shown in the panels of Fig. 12, can have wire imbedded therein and at least one of the sheets forming a panel can be of heat-absorbing glass.

It will be advantageous to have the flat sheet of heat-absorbing and hardened glass of types known in the industry, and the convex or channel sheet will have wire imbedded therein, and will be of the ordinary non-heat absorbing type. The heat-absorbing glass will permit the passage of a considerable amount of daylight, but is resistant to the passage of infrared rays, from the sun. In some cases where the heat-absorbing glass has wire imbedded therein, difficulty has been experienced through breakage when a part of the glass is exposed to sun rays, and the other part is in shadow, the presence of the wire being mainly responsible for this difficulty, and because wire glass cannot be hardened to the extent which it is possible to harden unwired glass.

By making the upper flat sheet in each panel of hardened glass, preferably without wire, it is not so liable to be broken by impact, while the wire in the lower channel sheet will prevent broken pieces of glass either from the flat sheet or the channel sheet falling into the building.

Panel elements of forms such as shown in Figs. 8 to 11 are so designed that even though they are made of glass or other vitreous material, they will, nevertheless, have strength adequate for the purpose intended. To this end, the edge portions of each panel are of such dimension and offset from the major part of the intermediate body portion such distance that the neutral axis or center of gravity will extend through the perpendicularly bent or offset edge portions in a plane that is spaced from the major part of the said intermediate portion a distance not less than several thicknesses of the glass. The panels, therefore, are of much greater strength for a given thickness of material than are corrugated glass sheets wherein the corrugations are of very shallow depth relative to the panels shown in said figures.

I claim as my invention:—

1. The combination with structural framework for buildings, of vitreous panels which are of generally channel form, means for connecting the panels to the framework, means for connecting and sealing the longitudinal edges of adjacent panels, the channels being outwardly exposed and edge portions thereof extending laterally in directions generally parallel to the plane of the panels, and filler blocks interposed between the said edge portions and the adjacent framework, at points adjacent to the ends of the panels.

2. The combination with structural framework for buildings, of panels which are of generally channel form, means for connecting the panels to the framework, means for connecting and sealing the longitudinal edges of adjacent panels, the channels being outwardly exposed and edge portions thereof extending laterally in directions generally parallel to the plane of the panels, filler blocks interposed between the said edge portions and the adjacent framework, at points adjacent to the ends of the panels, and fillers between the webs of the panels and the framework, adjacent to the ends of the panels.

3. The combination with structural framework for buildings, of a series of panels disposed in side-by-side relation and extending in a generally downward direction, each being of generally channel form but with its flanges flared, the channels being outwardly exposed, a second series of panels of similar form and arrangement, the upper edge of the second series being adjacent to, but in a plane rearwardly of, the lower edge of the first-named series, means for sealing the longitudinal edges of adjacent panels in each series, filler blocks interposed between the said flanges and the framework, at points adjacent to the ends of the panels, and filler members interposed between the web portions of the panels and the framework.

4. The combination with structural framework for buildings, of a series of panels disposed in side-by-side relation and extending in a generally downward direction, each being of generally channel form but with its flanges flared, the channels being outwardly exposed, a second series of panels of similar form and arrangement, the upper edge of the second series being adjacent to, but in a plane rearwardly of, the lower edge of the first-named series, means for sealing the longitudinal edges of adjacent panels in each series, filler blocks interposed between the said flanges and the framework, at points adjacent to the ends of the panels, and filler members interposed between the web portions of the panels and the framework, the adjacent ends of the two series being independently supported by the filler blocks.

FRANK W. PRESTON.